US008574360B2

(12) United States Patent
Feng et al.

(10) Patent No.: US 8,574,360 B2
(45) Date of Patent: Nov. 5, 2013

(54) CEMENTITIOUS FORMULATIONS AND PRODUCTS

(75) Inventors: Xiangdong Feng, Upland, CA (US); Meiling Gong, Upland, CA (US); Chinmay Avinash Gowardhan, Riverside, CA (US); Chongjun Jiang, Alta Loma, CA (US); Michael John Julius, Rancho Cucamonga, CA (US); Amitabha Kumar, Claremont, CA (US); Shannon Marie Labernik, Rancho Cucamonga, CA (US); Xiangyuan Liu, Rancho Cucamonga, CA (US); Liyan Ma, Alta Loma, CA (US); Basil Taha Naji, Upland, CA (US); Kalynne Hitzeman Paradis, Fontana, CA (US); David John Sharman, Rancho Cucamonga, CA (US)

(73) Assignee: James Hardie Technology Limited, Dublin (IE)

(*) Notice: Subject to any disclaimer, the term of this patent is extended or adjusted under 35 U.S.C. 154(b) by 0 days.

(21) Appl. No.: 13/405,173

(22) Filed: Feb. 24, 2012

(65) Prior Publication Data
US 2012/0152154 A1 Jun. 21, 2012

Related U.S. Application Data

(63) Continuation of application No. 12/244,753, filed on Oct. 2, 2008, now Pat. No. 8,147,610.

(60) Provisional application No. 60/976,992, filed on Oct. 2, 2007.

(51) Int. Cl.
| *C04B 14/00* | (2006.01) |
| *C04B 16/00* | (2006.01) |
| *C04B 24/00* | (2006.01) |
| *C04B 28/10* | (2006.01) |
| *C04B 7/00* | (2006.01) |
| *C04B 7/34* | (2006.01) |
| *C04B 28/00* | (2006.01) |
| *C04B 32/00* | (2006.01) |
| *C04B 18/06* | (2006.01) |
| *C04B 2/00* | (2006.01) |

(52) U.S. Cl.
USPC ........... 106/721; 106/638; 106/705; 106/796; 106/812

(58) Field of Classification Search
USPC ........ 106/721, 812, 638, 796, 705; 525/333.3
See application file for complete search history.

(56) References Cited

U.S. PATENT DOCUMENTS

| 3,574,113 | A | 4/1971 | Shannon |
| 3,582,377 | A | 6/1971 | Hays et al. |
| 3,634,567 | A | 1/1972 | Yang |
| 3,679,446 | A | 7/1972 | Kubo |
| 3,824,109 | A | 7/1974 | Richards |
| 3,998,651 | A | 12/1976 | Baudouin et al. |
| 4,040,851 | A * | 8/1977 | Ziegler ............................ 428/532 |
| 4,118,236 | A | 10/1978 | Erskine et al. |
| 4,240,840 | A | 12/1980 | Downing et al. |
| 4,306,911 | A | 12/1981 | Gordon et al. |
| 4,350,567 | A | 9/1982 | Moorehead et al. |
| 4,357,271 | A | 11/1982 | Rosenquist |
| 4,375,489 | A | 3/1983 | Muszynski |
| 4,797,161 | A | 1/1989 | Kirchmayr et al. |
| 5,099,923 | A | 3/1992 | Aften et al. |
| 5,232,497 | A | 8/1993 | Dillenbeck et al. |
| 5,256,349 | A | 10/1993 | Sato et al. |
| 5,342,530 | A | 8/1994 | Aften et al. |
| 6,030,447 | A * | 2/2000 | Naji et al. ...................... 106/718 |
| 6,248,812 | B1 | 6/2001 | Symons et al. |
| 6,346,146 | B1 | 2/2002 | Duselis et al. |
| 6,444,316 | B1 | 9/2002 | Reddy et al. |
| 6,506,248 | B1 | 1/2003 | Duselis et al. |
| 6,676,745 | B2 | 1/2004 | Merkley et al. |
| 6,875,503 | B1 | 4/2005 | Famy |
| 6,902,797 | B2 | 6/2005 | Pollock et al. |
| 6,936,098 | B2 * | 8/2005 | Ronin ............................ 106/735 |
| 6,962,623 | B2 | 11/2005 | Matsuyama et al. |

(Continued)

FOREIGN PATENT DOCUMENTS

| EP | 12546 | 6/1980 |
| EP | 127960 | 12/1984 |

(Continued)

OTHER PUBLICATIONS

Edgar Minerals. "Material Safety Data Sheet Kaolin". 2010 [Retrieved on Mar. 14, 2011]. Retrieved from http://www.edgarminerals.com/Sites/48/Downloads/Kaolin%20MSDS%2001-01-201-0.pdf.

U.S. Department of Transportation: Federal Highway Administration. "Superplasticizers". Sep. 10, 2005 [Retrieved on Mar. 14, 2011]. Retrieved from http://replay.waybackmachine.org/20050910023724/http://www.fhwa.dot.gov/i-nfrastructure/materialsgrp/suprplz.htm.

Duxson, et al. "The Thermal Evolution of Metakaolin Geopolymers: Part 2—Phase Stability and Structural Development," Journal of Non-Crystalline Solids 353 (2007), p. 2186-2200.

Fortes-Revilla et al. "Modelling of Slaked Lime-Metakaolin Mortar Engineering Characteristics in Terms of Process Variables," Cement & Concrete Composites 28 (458-467) 2006.

Badogiannis et al. "Metakaolin as a Main Cement Constituent. Exploitation of Poor Greek Kaolins," Cement & Concrete Composites 27 (2005) pp. 197-203.

(Continued)

Primary Examiner — Kaj K Olsen
Assistant Examiner — Karam Hijji
(74) Attorney, Agent, or Firm — Knobbe Martens Olson & Bear, LLP

(57) ABSTRACT

Cementitious formulations and their products with enhanced reactivity are provided. Formulations in certain embodiments may include at least one calcium source, a reactant and a filler in a hydrated environment, wherein the reactant, in one form, is crystalline silica that has been modified for reactivity. Enhancement of a reactant may include one or more modifications to its content, grind and/or the cement to silica ratio, as well as addition of one or more additives in the formulation, additives in the form of at least one alumina source, defoamer, catalyst and/or a clay.

12 Claims, No Drawings

(56) References Cited

U.S. PATENT DOCUMENTS

| | | |
|---|---|---|
| 7,128,965 B2 | 10/2006 | Famy |
| 8,147,610 B2 | 4/2012 | Feng et al. |
| 2001/0008910 A1 | 7/2001 | Yu et al. |
| 2001/0047741 A1 | 12/2001 | Gleeson et al. |
| 2002/0059886 A1 | 5/2002 | Merkley et al. |
| 2002/0112827 A1 | 8/2002 | Merkley et al. |
| 2002/0166479 A1 | 11/2002 | Jiang |
| 2004/0107872 A1 | 6/2004 | Matsuyama et al. |
| 2004/0220317 A1 | 11/2004 | Lorah et al. |
| 2005/0000393 A1 | 1/2005 | Virtanen |
| 2005/0072056 A1 | 4/2005 | Famy et al. |
| 2005/0284339 A1 | 12/2005 | Brunton et al. |
| 2006/0107872 A1 | 5/2006 | Chen |
| 2006/0288909 A1 | 12/2006 | Naji et al. |
| 2007/0131145 A1 | 6/2007 | Biscan et al. |
| 2007/0209554 A1 | 9/2007 | Luna et al. |

FOREIGN PATENT DOCUMENTS

| | | |
|---|---|---|
| EP | 136790 | 4/1985 |
| EP | 263723 | 4/1988 |
| EP | 419657 | 4/1991 |
| EP | 1227199 | 7/2002 |
| GB | 1337129 | 11/1973 |
| GB | 1543460 | 4/1979 |
| JP | 1290402 | 11/1989 |
| JP | 3208871 | 9/1991 |
| JP | 7010621 | 1/1995 |
| JP | 11077650 | 9/1997 |
| JP | 2002-338323 | 11/2002 |
| JP | 2004-018353 | 1/2004 |
| JP | 2004231480 | 8/2004 |
| JP | 2004314456 | 11/2004 |
| WO | WO-9708111 | 3/1997 |
| WO | WO-0000449 | 1/2000 |
| WO | WO-0232830 | 4/2002 |
| WO | WO-0233164 | 4/2002 |
| WO | WO 02/066396 A1 | 8/2002 |
| WO | WO 2009/046230 | 4/2009 |

OTHER PUBLICATIONS

Courard et al. "Durability of Mortars Modified with Metakaolin" Cement and Concrete Research 33 (2003) pp. 1473-1479.

Li et al. "Property Improvement of Portland Cement by Incorporating with Metakaolin and Slag," Cement and Concrete Research 33 (2003) 579-584.

Saikia et al. "Cementitious Properties of Metakaolin—Normal Portland Cement Mixture in the Presence of Petroleum Effluent Treatment Plant Sludge," Cement and Concrete Research 32 (2002), pp. 1717-1724.

Asbridge et al. "Effects of Metakaolin, Water/Binder Ratio and Interfacial Transition Zones on the Microhardness of Cement Mortars," Cement and Concrete Research 32 (2002) pp. 1365-1369.

Poon et al. "Rate of Pozzolanic Reaction of Metakaolin in High-Performance Cement Pastes," Cement and Concrete Research 31 (2001) pp. 1301-1306.

Boddy et al. "Long-Term Testing of the Chloride-Penetration Resistance of Concrete Containing High-Reactivity Metakaolin," Cement and Concrete Research 31 (2001) pp. 759-765.

Collier et al. "Encapsulation of Iron Hydroxide Floc in Composite Cement," Immobilisation Science Lab., Dept of Engineering Materials, 2004, (4 pgs).

Japanese Office Action issued in Japanese Patent Application No. 2010-528140, dated Oct. 2, 2012, with English Translation.

Third Party Submission Document 1 filed in connection with Japanese Patent Application No. 2010-528140.

Third Party Submission Document 2 filed in connection with Japanese Patent Application No. 2010-528140.

* cited by examiner

CEMENTITIOUS FORMULATIONS AND PRODUCTS

CROSS-REFERENCE TO RELATED APPLICATIONS

This application is a continuation application of U.S. patent application Ser. No. 12/244,753 now U.S. Pat. No. 8,147,610, filed Oct. 2, 2008, which claims the benefit of priority under 35 U.S.C. §119(e) of U.S. Provisional Application No. 60/976,992 filed Oct. 2, 2007. Each of the application is incorporated herein by reference in its entirety.

BACKGROUND OF THE INVENTION

Hydrated cementitious formulations are often exposed to hydrothermal conditions for curing. Unfortunately, crystalline silica, which is a typical component used in cementitious formulations, is a poor pozzolan and does not react well with calcium to form tobermorite, one of the important calcium silicate hydrate phases in cement.

SUMMARY OF THE INVENTION

As described, the invention relates generally to the field of cementitious formulations and in particular to improved formulations and formation of such formulations into articles, materials and products and in one or more embodiments provides improved formulations that undergo hydrothermal reactions to cure.

In various embodiments, as provided herein, are formulations that enhance pozzolan behavior of one or more reactants provided in the formulation. Formulations herein include at least one calcium source, reactant and filler, provided typically in a hydrated environment. Additional components may be included and manipulated to further define requisite properties of the formulation depending on use.

In certain embodiments, the reactant is crystalline silica that has a modified content, grind, cement-silica ratio, alumina source, filler source and variations or combinations thereof.

One or more embodiments include a cementitious formulation comprising an reactant, a calcium source, and a filler, wherein a calcium oxide to total silicon dioxide molar ratio is between about 0.80 and 1.80 in the formulation after matrix formation, wherein the calcium oxide to residual silicon dioxide molar ratio is between about 1.0 and 8.0 in the formulation, and wherein the total silicon dioxide molar ratio is the sum of reacted silica from any source in the formulation after a curing.

Still other embodiments include a cementitious formulation comprising an enhanced reactant, a calcium source, and a filler, wherein the reactant includes crystalline silica, wherein a calcium oxide to total silicon dioxide molar ratio is between about 0.80 and 1.80 in the formulation after a curing, wherein the calcium oxide to residual silicon dioxide molar ratio is between about 1.0 and 8.0 in the formulation, and wherein the total silicon dioxide molar ratio is the sum of reacted silica from any source in the formulation after the curing.

Further embodiments include a cementitious formulation comprising an enhanced reactant, a calcium source, and a filler, wherein the reactant includes crystalline silica and an alumina source, wherein a calcium content to $(SiO_2+Al_2O_3)$ content as a weight ratio is between about 0.50 and 1.30 wherein Al to [Al+Si] as a weight ratio is between about 0.06 and 0.14 in the formulation after a curing.

Other embodiments include a cementitious formulation comprising an enhanced reactant, a calcium source, and a filler, wherein the reactant includes crystalline silica and a catalyst, wherein the catalyst withdraws one or more electrons from the reactant thereby reducing bond strength of the reactant, wherein the catalyst includes a chloride salt, alkaline earth metal chlorite and/or alkali chlorite.

Still further embodiments include a cementitious formulation comprising an enhanced reactant, a calcium source, and a filler, wherein the reactant includes crystalline silica and a catalyst, wherein the catalyst donates one or more electrons from the reactant thereby weakening bond strength of the reactant, wherein the catalyst includes a soluble hydroxide, fluoride, carbonate, sulfate, isocyanate and/or silicate.

Additional embodiments include a cementitious formulation comprising an enhanced reactant, a calcium source, and a filler, wherein the reactant includes crystalline silica and a clay, wherein the clay increases reactivity of the reactant and increases time to cure of the formulation, wherein the clay includes a hydroxylated clay.

Even further embodiments include a cementitious formulation wherein the formulation comprises an enhanced reactant of crystalline silica provided at about 30 wt. % or less of the formulation, wherein the reactant reacts during a hydrothermal curing in the presence of an additive, wherein the additive enhances reactivity by increasing the time to cure of the formulation as compared with an equivalent formulation lacking the additive.

Those skilled in the art will further appreciate the above-noted features and enhancements together with other important aspects thereof upon reading the detailed description that follows in conjunction with the drawings.

DETAILED DESCRIPTION OF THE PREFERRED EMBODIMENT

The invention, as defined by the claims, may be better understood by reference to the following detailed description. The description is meant to be read with reference to the tables contained herein. This detailed description relates to examples of the claimed subject matter for illustrative purposes, and is in no way meant to limit the scope of the invention. The various embodiments discussed herein are merely illustrative of ways to make and use the invention, and do not limit the scope of the invention.

Formulations as described herein rely on a reaction between a pozzolan (reactant), a calcium source and a filler. A suitable and typical pozzolan or reactant herein is silica provided, in one form, as crystalline silica (e.g., quartz silica).

It is generally understood that when a pozzolan is in the presence of a calcium source, it forms a matrix of calcium silicate hydrate. Unfortunately, crystalline silica, being a very poor pozzolan does not react well in this environment. Crystalline silica is an inert and relatively unreactive material commonly used as a filler in cementitious formulations. Relying on an inert material or a poorly reactive pozzolan means that a very large amount of the material is required for matrix formation. As a result, in a matrix formed by such a poor pozzolan, a large portion of the pozzolan remains unreactive (constituting generally greater than 70% of its total mass). When such a pozzolan is in a cementitious formulation and in a large amount (e.g., greater than 40 wt. % or 50 wt. % or 60 wt. % of the formulation) and is a poorly reactive pozzolan—which is common for current formulations made with siliceous sand—then a large portion of the formed matrix is made up of the unreactive pozzolan that then behaves as a filler.

Coarse-ground crystalline silica particles exhibit very poor pozzolanic reactivity when prepared in a cementitious formulation under hydrothermal conditions. Only a small outer portion of the particle actually reacts in these conditions, generally constituting a surface layer of little more than 20% of total mass. This leaves a large volume of the particle as an unreacted core and to serve as a filler. Consequently, relatively high silica quantities (greater than 40% and ever greater than 60% by total weight) need to be incorporated in a formulation for a final composition to achieve a required strength after a hydrothermal curing. A large amount of unreacted crystalline silica is, in many ways, undesirable due to its poor performance, thus requiring a high pozzolan volume, high amount of raw material and storage for such large volumes of material. There remains a need to enhance pozzolanic reactivity of crystalline silica, particularly in hydrothermal conditions.

Cementitious formulations described herein are prepared with a highly reactive pozzolan with or without preferred additives that enhance reactivity and dissolution of the pozzolan, thereby reducing the actual amount of pozzolan required in the formulation. In addition, such preparations provide a means for reducing the residual (unreacted) pozzolan content in the matrix after a curing.

In one or more preferred embodiments, an enhanced pozzolan is provided in a formulation wherein reactivity of the pozzolan is increased. Reactivity of the reactant is purposefully improved by modifying its surface area. Means for enhancing reactivity include effects on reactant grind, ratio with respect to a calcium source and/or an alumina source, ratio with respect to a filler type and/or its source, addition of one or more preferred additives and combinations thereof. In one or more embodiments, the pozzolan (reactant) is crystalline silica. The purposeful change in reactivity of a reactant described herein, such as crystalline silica, is found to provide useful formulations for cementitious materials, articles or products.

According to one or more embodiments disclosed herein, various combinations of preferred additives in the form of one or more catalysts, defoaming agents, alumina source, as examples, are included in cementitious formulations described herein to enhance reactivity of the reactant and/or preferred properties of the formulation when cured.

Silica refers generally to a naturally occurring mineral composed of silicon dioxide ($SiO_2$). Silicon dioxide exists in both crystalline and amorphous forms. Crystalline silica in a wt. % greater than 50% and often greater than 60% or 70% is typically used in current (conventional) cementitious formulations. Crystalline silica is most often in the form of quartz, cristobalite or tridymite; such forms are often interrelated and can change from one to another under different conditions of temperature and pressure. The most common form of crystalline silica is quartz. Quartz itself arises in two different forms: alpha quartz and beta quartz. The most common form is alpha-quartz which is a large component of igneous rocks (e.g., granite, pegmatite) as well as occurring largely in sandstone and sedimentary rock (e.g., slate, shale). Quartz also exists in many synthetic forms. Other forms of crystalline silica include stishovite, moganite and coesite.

A pozzolan, when provided as crystalline silica in a cementitious formulation is preferably in a wt. % of less than 25%, preferably less than 20%, preferably less than 15%, preferably less than 10% (on a total dry weight basis). In some embodiments, crystalline silica may be added to the formulation in an amount of about or less than 5%. When provided in other forms, the silica content remains preferably less than 25 wt. %, preferably less than 20 wt. %, preferably less than 15 wt. %. In some embodiments the silica content may be at or about 5 wt. %, up to about 15 wt. %.

When provided in a cementitious formulation as a pozzolan, a reactant, such as reactive silica described herein, interacts with a calcium source. Because the reactant is modified for enhanced reactivity, formulations herein when prepared have significant reductions in the amount of residual silica content found in the formed matrix. As compared with other known formulations (e.g., typical hydrothermally-cured cementitious formulations know or made in the art) in which residual silica is as much as 50% and 60% of the matrix, formulations herein once cured provide a residual (unreacted) silica of preferably less than 15%, less than 10%, or less than 5%. In some embodiments, residual silica content may be negligible.

In addition to crystalline silica, a reactant described herein may further comprise one or more additives, such as an alumina source in any form of aluminium oxide ($Al_2O_3$), such as from an aluminous ore, hydrated alumina material, one or more pozzolans and/or an alumino silicate including those stabilized by thermal or chemical dehydroxylation. Examples of an alumina source include but are not limited to alumina trihydrate and clay (dehydroxylated or other forms). In one or more embodiments herein, silica (e.g., reactant) is provided as an aluminosilicate, preferably in a stabilized form (e.g., clay, dehydroxylated clay, slag). The alumina source is typically between about 0.25% and 10 wt. %. The alumina source may be less than 6 wt. % or less than 4 wt. %. In some embodiments, the alumina source may be less than 3 wt. %. When the reactant is crystalline silica with an alumina source, a silica to alumina ratio (in wt. %) is 5:1, 4:1 and may be 3:1, 2:1 or 1:1. In additional embodiments, the silica to alumina ratio (in wt. %) may be 1:2, 1:3, 1:4, 1:5 and as much as 1:10.

The reactant described herein is combined with a filler and a calcium source to provide a cementitious formulation. A suitable filler is a material that, itself, is not generally reactive and, unlike a reactant, does not generally undergo substantial dissolution. A filler may be fully or partially inert. An example of a partially inert filler is clay. A filler may also include a calcareous material that has little effect on hydration of the formulation into which it is provided. Suitable examples include calcium carbonate or limestone, expanded perlite, talc, slags, lime, dolomite, slate dust and diabase stone dust. It will be appreciated that in some embodiments, the calcareous material may include a reactant material (e.g., a siliceous limestone deposit). Accessory non-clay minerals may also be regarded as fillers. When lime is provided in the formulation, a substantial quantity is consumed and lime is liberated during the cementitious reaction thereby decreasing lime blooming following a curing, which normally occurs when the curing is under hydrothermal conditions.

A suitable filler material is added in an amount ranging between about 20 to 80 wt. %, or 25 to 70 wt. % or 30 to 65 wt. % of the dry formulation. In some embodiments, the filler amount may be less than 60 wt. % or less than 50 wt. %. Particle size of the filler is typically less than 1.5 mm. While fillers of very fine particles are typically used in current and known cement formulations, described herein, in one or more embodiments, it has been found that a preferred filler may have a more coarse particle size. Preferably the filler material has an average particle size of less than 50 microns or preferably less than 30 microns. The filler is generally of low density, between about 90 to 130 kilograms per cubic meter ($kg/m^3$).

A calcium source is typically provided as a hydraulic binder (e.g., cement, clinker, Portland cement, blast furnace slag). The hydraulic binder itself may further comprise one or more of limestone (typically less than 5% by mass), fly ash, clay, shale, sand, iron granulated slag or other typical secondary raw materials. In some embodiments, the hydraulic binder is a silica rich binder (e.g., belite cement). Examples of useful binders are anhydrous clinker or slag that set by hydration. A filler may also serve as the calcium source. Additional or alternative calcium sources include non-hydraulic binders (e.g., lime-containing materials that are hydrated or unhydrated and natural cements). In several embodiments, a ratio of calcium to silica in the formulation is close to or about 1.0 when formulations are cured under hydrothermal conditions. The ratio, however, as further described, may be adjusted when taking into account the amount of reactant, its properties and its reactivity.

Typically, the calcium source in a dry mixture is in an amount between about 20 to 95 wt. % and may be between about 30 to 90 wt. %. In one or more embodiments, the calcium source is greater than 35 wt. % and less than 85 wt. %. Often, the calcium source has an average particle size between about 1 to 150 microns and may be less than 100 microns, or less than 50 microns. The calcium source may have a fineness index between about 200 to 450 $m^2/kg$ or between about 250 to 400 $m^2/kg$.

When a siliceous material is added to a formulation described herein as a density modifier to lower the bulk density of the cured formulation, the material may be the same or different from that used as the reactant. Alternately, and in some preferred embodiments, calcium silicate hydrate (CSH) may be added.

Formulations described herein may further comprise a fibrous material and/or additional chemical additives to those described above. Other chemical additives aid in maintaining or decreasing moisture movement of a formulation after a curing, as well as, improving workability, durability and overall performance of cementitious formulations or the materials formed therefrom. Such additives when incorporated into a formulation are in an amount between about 5 to 50 wt. %, or 10 to 40 wt. % or 15 to 30 wt. % of the dry formulation. Suitable chemical additives include but are not especially limited to one or more density modifiers, dispersing agents, mineral oxides, hydroxides, metal oxides, clays, silica fume or amorphous silica, geothermal silica, fire retardants, biocides, thickeners, pigments, plasticizers, colorants, dispersants, foaming agents, flocculating agents, water-proofing admixtures, water reducing admixtures, setting rate modifiers, shrink compensators, set accelerators, set retarders, gas forming agents, air entraining agents, hardeners, filtering aids, mica, wollastonite, and polymer additives (e.g., polymers and co-polymers of acrylamide, methacrylamide, polyester polyvinyl acetate and/or polystyrene; methyl cellulose; polymeric resin emulsions and mixtures thereof).

In certain embodiments, a fibrous material may be added to a formulation before a curing. A fibrous material may include a synthetic fiber and/or a natural fiber (e.g., cellulose fiber, such as from softwood and hardwood or non wood cellulose fibers) and/or fiber from pulps in rolls, bales and/or fiberized (e.g., hammer-milled or refined). Such fibers may be suitably modified, such as by de lignification, bleaching (partial or otherwise) and/or processed. Fiber processing includes methods known to one of ordinary skill in the art, such as the Kraft process. Examples of suitable fibers include cellulose fibers, ceramic fibers, glass fibers, mineral wool, steel fibers, synthetic polymers such as polyamides, polyesters, polypropylene, polyacrylonitrile, polyacrylamide, viscose, nylon, PVC, PVA, rayon, glass, ceramic, carbon or any mixtures thereof.

As described herein are cementitious formulations comprising at least an enhanced pozzolan, a calcium (Ca) source and a filler. In many embodiments, the pozzolan is a silicon (Si)-containing reactant. The silicon-containing reactant may further comprise one or more additives, such as an alumina (Al) source that also enhance reactivity. In some embodiments, the reactant is crystalline silica. In addition or as alternative the reactant is an aluminosilicate. When said components are combined in a cementitious formulation, elemental ratios are selected to meet certain proportions after a curing. In particular, such proportions are ideally met under hydrothermal conditions. The ratios are based on reacted oxide and include:

Ca to ($SiO_2+Al_2O_3$) as a weight ratio of between about 0.50 and 1.30, or between about 0.60 and 1.10, or between about 0.70 and 0.90;

Al to [Al+Si] as a weight ratio of between about 0.06 and 0.14, or between about 0.07 and 0.12, or between about 0.08 and 0.10;

CaO to [Total $SiO_2$] as a molar ratio of between about 0.80 and 1.80, or between about 1.00 and 1.80 or between about 1.20 and 1.60, wherein Total $SiO_2$ refers to the sum of reacted silica from any source (including amorphous and crystalline sources); and CaO to [residual $SiO_2$] as a molar ratio of between about 1.00 and 8.00, or between about 1.50 and 5.00 or between about 2.0 and 3.0, wherein residual $SiO_2$ refers to reacted silica from one or more crystalline silica sources after the curing.

When a reactant is crystalline silica, residual crystalline $SiO_2$ content after a hydrothermal curing (based on total weight) may be between 5% and 30%, or less than 25%, or less than 20%. Residual crystalline $SiO_2$ may also be less than 10% or even negligible; residual $SiO_2$ is the reacted silica from one or more crystalline silica sources after the curing.

Cementitious formulations are typically manufactured into cementitious articles, materials and/or cementitious composite products. Generally, a preferred method of manufacturing such articles, materials or products includes providing an enhanced reactant, a calcium source and a filler material in an aqueous medium to form a reaction mixture. The ingredients are typically provided in dry form in the aqueous medium, although not all ingredients are required to be in a dry form. The reaction mixture may be pre-formed into a shaped article or simply allowed to pre-cure. While a pre-curing is not essential, in many embodiment it is a preferred step for shaped article, because pre-curing has been found to provide stability to the shaped article and may decrease defects (e.g., blisters, random expansions) and promote later curing. Depending on size and shape, useful pre-curing times are from about 2 hours after forming to about 48 hours after forming, or from about 6 to 24 hours after forming, or for less than 12 hours after forming. In some embodiments, a pre-curing time may be up to about 8 hours after forming. The pre-cured reaction mixture (shaped or otherwise) is then further cured under hydrothermal conditions. After the further curing the mixture may be shaped or further shaped (if pre-formed).

In some preferred embodiments, the aqueous medium is water. Under such embodiments, ingredients for a reaction mixture are typically batched together as an aqueous mix before a pre-curing. The batched reaction mixture is then either pre-formed or not before further processing. It will be appreciated that in some further processing steps, a lower water content may be useful for the reaction mixture when in an aqueous slurry. Indeed, for processes such as extrusion, the reaction mixture may be in the form of a paste. Variations between a slurry and paste will be prepared as desired, such variations being made without undue experimentation.

When pre-forming a reaction mixture, the mixture is formed into a green article. Any of a number of processes known to one of skill in the art may be useful for forming the green article. Such processes include Hatschek process, extrusion, Mazza pipe process, Magnani sheet process, Fourdrenier method, injection molding, hand lay-up, molding, casting, filter pressing, flow on machine or roll pressed processes. Processing may include additional post-forming processes such as pressing, embossing and the like, after the green article is formed. As an example, cementitious formulations described further herein were manufactured by a Hatschek process.

A formed green article is cured using known curing methods, such as a hydrothermal curing. In one or more embodiments, hydrothermal curing relies on an autoclave. It has been found that hydrothermal curing using an autoclave provides an appropriate temperature and pressure condition. A proper matrix may be selected for desired strength properties in the formed article (e.g., formation of appropriate CSH phases, such as maximizing tobermorite content as needed).

In several embodiments, a formed green article is pre-cured before a further curing. An example of a pre-curing is to allow the formed green article to set for several hours at room temperature.

A surprising outcome of certain formulations described herein is that when provided in a reaction mixture and under hydrothermal conditions, the reaction mixture triggers a reaction of the reactant and the calcium source to form advanced CSH phases, such as tobermorite ($Ca_5Si_6(O,OH)_{18}.5H_2O$ or $Ca_5Si_6O_{16}OH_2.4H_2O$) and katoite ($Ca_3Al_2(SiO_4)_{1.5}OH_6$ also known as tri-calcium aluminate hexahydrate or hydro garnet), which may enhance strength-contributing phases in a cementitious matrix. In certain formulations described herein, a stabilized matrix may be formed that exhibits little dimensional variation, little variance in moisture content and has suitable mechanical strength for known and desirable uses.

Prior art teaches that cementitious formulations will often contain as high as 66 wt. % of select medium grind silica by weight on a dry solids basis. Thus, wherein commercial formulations typically rely on medium grind silica (350 $m^2$/kg Blaine value or silica particles with a median particle diameter [$d_{50}$] of about 21 micron or greater), in one or more embodiments, formulations herein may include fine grind silica (e.g., $d_{50}$ between about 5 micron and 15 microns). The finer the grind, the better the reactivity due in part to a partial amorphization of silica particles (e.g., partial change in crystallinity, sometimes to a noncrystalline form) that increases surface area of the reactant as well as reaction sites for interacting with a calcium source during a curing.

In many embodiments, reactive silica described herein is greater than 500 $m^2$/kg Blaine and at or greater than 700 $m^2$/kg Blaine. Formulations herein may often include very low amounts of reactant depending on the enhancement of reactivity. In many embodiments, fine grind silica is added to a formulation in an amount less than 40 wt. %, less than 30 wt. %, less than 20 wt. %, less than 15 wt. % or less than 10 wt. % based on total dry weight of the formulation. Fine grind silica as used herein is typically less than 20 microns in diameter, or having a $d_{50}$ less than 15 microns, or less than 10 microns. In some embodiments, a useful high reactive silica has a $d_{50}$ of about 5 microns. A fine grind silica may be greater than about 5 microns and less than about 15 microns in diameter.

As described previously, increasing pozzolan reactivity by one or more means as described herein decreases the initial content (amount) of reactant added in preferred formulations and also decrease residual content of the unreacted portion that remains following a curing. An example is shown in TABLE 1 in which a first formulation (A) having medium grind quartz silica (350 $m^2$/kg Blaine; $d_{50}$ of 21 micron) that is less reactive is compared to several enhanced formulations (B, C, D) having high reactive fine grind quartz silica (700 $m^2$/kg Blaine; $d_{50}$ of 13 micron). All comparative formulations (B, C, D) had the same amount of cement as a calcium source and the same amount of $AH_3$ as an additive and alumina source with differing amounts of fine grind quartz silica. Percentages of initial silica is provided as a wt. % based on total dry ingredients. All formulations were hydrated with water and cured under the same hydrothermal condition before determining residual silica content and reactivity. Residual content is determined by quantitative X-ray powder diffraction (XRD). Reactivity is assessed by comparing the total silica present to the amount converted into calcium silicate hydrate.

TABLE 1

| | Initial Silica | Residual Silica | Reactivity |
|---|---|---|---|
| Formulation A: medium grind silica | 60% | 56% | 9% |
| Formulation B: fine grind silica | 15% | 8% | 52% |
| Formulation C: fine grind silica | 12.5% | 5% | 58% |
| Formulation D: fine grind silica | 10% | 3% | 69% |

In another example, filter pads of a cementitious formulation described herein with fiber-reinforcement were prepared having dimensions 250 mm×250 mm×8 mm without post-pressing. Filter pads for this and other described examples were prepared relying on a known bench scale design that simulates the Hatschek process. In brief, prototypes as boards were produced by first mixing each formulation identified in TABLE 2 to form a homogenous slurry using a Hobart mixer. Each slurry was compressed between two steel dewatering plates at about 3500 psi for one minute with a suitable press to form a monolithic sheet (about 10"×10"). The slurry was supported with steel wire mesh screens (30 to 40 US mesh—placed underneath and on top of the slurry mix) and positioned in a steel frame mold. The sheet was 11 pre-cured for about 12 hours and autoclaved at elevated temperature (at 170-190° C.) under pressure conditions in a steam saturated environment for about 8 hours.

Referring to TABLES 2, 3 and 4, Formulation E, a control, is a typical cementitious formulation made with a high level of medium-grind crystalline silica (53.25 wt. % with a $d_{50}$ of 25 micron). With the reactant in such a high amount in Formulation E, the reactant served predominantly as a filler. An alumina source as hydrated alumina was also provided in Formulation E at 3.50 wt. %. The control formulation was compared with a representative formulation described herein (F) that included 15 wt. % of a fine grind crystalline silica ($d_{50}$ of 13 micron) as a reactant in addition to the same alumina source as Formulation E (hydrated alumina at 2.75 wt. %) and a filler as limestone at 39.75 wt. %. Alumina was higher in the control formulation (E) to try to enhance reactivity because the reactant used is a poor pozzolan. For both formulations, the same amount of the same calcium source was provided (35 wt. %). In addition, fiber reinforcement was provided to both formulations in the form of cellulose fibers. Major constituents for each formulation are shown in TABLE 2; all percentages are in dry weight.

TABLE 2

|  | Cement | Medium grind silica | Fine grind silica | Alumina | Filler | Fiber |
|---|---|---|---|---|---|---|
| Formulation E | 35.00% | 53.25% | 0.00% | 3.50% | 0.00% | 8.25% |
| Formulation F | 35.00% | 0.00% | 15.00% | 2.75% | 39.75% | 7.50% |

Formulations E and F when formed into prototypes as described above were submitted to a three-point bending strength (flexure) analysis and a modulus of rupture (MOR) analysis. Specimen for analyses were 190×50 mm and analyses took place under saturated and dry conditions.

Bending (flexural) strengths were determined after immersion in water for about 24 hours at 20° C., which may also be used to evaluate a saturated MOR value. Flexural strengths were also determined after specimens were dried at 20° C. and 60% relative humidity, which may also be used to evaluate a dry MOR value. Final bending strength values were made as an average of three or four data points.

Samples were further tested for shrinkage or moisture movement using specimens of 240×24 mm. Moisture movement as described herein is a change in total length when measured in a saturated condition and dry condition (e.g., after hydrothermal drying). The percentage change m moisture movement is provided m equation 1 below:

$$\frac{\text{Length}_{initial} - \text{Length}_{final}}{\text{Length}_{initial}} \times 100 \quad (1)$$

The initial length of a saturated specimen was measured after immersion in water for up to about 48 hours. Final length was measured after a specimen was dried at 105° C. in an environmental chamber (length was measured when a change in mass of the specimen was less than 0.1%). Specimens were also evaluated for carbonated moisture movement which is determined before and after specimens were subjected to carbon dioxide gas in a chamber. Shrinkage value was measured as a mean of two or more samples. Specimens were also tested for the flexural toughness (total energy per unit volume absorbed by a test specimen up to the point of maximum load).

TABLE 3A illustrates mechanical properties for representative specimens prepared from Formulation E or Formulation F. The table illustrates that a formulation described herein is desirable as compared with a typical cementitious formulation (E) conventionally used to prepare a fiber cement board. In addition, a reduction in fiber reinforcement was allowed with the improved formulation described herein. Moisture movement in prototypes prepared from a formulation described herein (F) were better, providing for enhanced dimensional stability as compared with the control formulation. This result is quite unexpected, given that Formulation F contained 21% less hydrated alumina content as compared with the control formulation (E, see TABLE 2).

TABLE 3A

|  | Formulation E | Formulation F |
|---|---|---|
| Saturated ultimate strength (flexure), MPa | 8.30 | 8.20 |
| Saturated ultimate strain (flexure), μm/m | 5410 | 5790 |
| Moisture movement (pre-carbonation), % | 0.11 | 0.11 |

TABLE 3A-continued

|  | Formulation E | Formulation F |
|---|---|---|
| Moisture movement (post-carbonation), % | 0.40 | 0.30 |
| Oven dry, density, kg/m$^3$ | 1.33 | 1.34 |

Silica reactivity and crystalline silica content (residual content) after a curing were evaluated as described previously. TABLE 3B illustrates the silica content before and after curing. Reacted silica is identified as the wt % of residual silica after curing subtracted from the initial silica content in the formulation before curing. Silica reactivity is the reacted silica divided by the initial silica content in the formulation before curing. Phases of the matrix (e.g., tobermorite or katoite) were evaluated based on X-ray diffraction data.

TABLE 3B

|  | Formulation E | Formulation F |
|---|---|---|
| Average crystalline silica particle size ($d_{50}$), μm | 25 | 13 |
| Initial silica before curing, % | 53.25 | 15.00 |
| Residual silica after curing, % | 39.20 | 5.95 |
| Reacted silica, % | 13.95 | 9.05 |
| Silica reactivity, % | 0.26 | 0.54 |
| Tobermorite, % | 17.4 | 9.60 |
| Katoite, % | 3.60 | 6.50 |

TABLE 3A and 3B illustrate that a formulation described herein in which initial crystalline silica content was greatly reduced (silica content of 15 wt. %, $d_{50}$=13 micron) is able to exhibit comparable flexural strength to that of a control formulation (E) that is rich in silica (silica content of 53.25 wt. %). Formulation F showed about 35% reduction in reacted silica, about 45% reduction in tobermorite content and about 45% increase in katoite content (an alumina rich crystalline phase) as compared with Formulation E.

TABLES 4A and 4B show that furthering reactivity of a reactant (e.g., increasing surface area and/or reducing median particle size) permits the increased usage of what is typically considered an inert filler material (e.g., limestone) and improve mechanical properties of a formed matrix.

TABLE 4A

|  | F2 | F3 | F4 | F5 | F6 | F7 |
|---|---|---|---|---|---|---|
| Cement | 40 | 40 | 40 | 40 | 40 | 40 |
| Filler | 45 | 35 | 45 | 35 | 45 | 35 |
| Extra fine grind silica | 15 | 25 | 0 | 0 | 0 | 0 |
| Fine grind silica | 0 | 0 | 15 | 25 | 0 | 0 |
| Medium grind silica | 0 | 0 | 0 | 0 | 15 | 25 |
| Water | 32 | 32 | 32 | 32 | 32 | 32 |

TABLE 4A shows additional formulations (F2 to F7) that included a calcium source provided in the form of ordinary Portland cement, a filler provided as course limestone (ground and passed through a 200 mesh) and a reactant. The reactant was either medium grind silica ($d_{50}$ of 21 micron), fine grind silica ($d_{50}$ of 4 micron) or extra fine grind silica ($d_{50}$ of 1.5 micron). Filler was adjusted to accommodate reduced silica content in Formulations F2, F4, and F6; total solids content was the same for each formulation. All formulations were prepared by mixing dry materials in a mechanical mixer with water to form a slurry paste and were cured in a steam autoclave at a temperature of about 173° C. for about 8 hours.

After a curing, specimens were cooled to room temperature and acid insoluble residue and compressive strength were measured as shown in TABLE 4B. Major constituents for each formulation are shown in TABLE 4A and provided in parts by weight.

TABLE 4B

|  | F2 | F3 | F4 | F5 | F6 | F7 |
|---|---|---|---|---|---|---|
| Acid insoluble residue, wt. % | 0.4 | 9.5 | 2.5 | 9.1 | 6.2 | 9.9 |
| Compressive strength, MPa | 66.0 | 71.5 | 50.7 | 67.3 | 55.7 | 59.3 |

TABLE 4B shows acid insoluble residue of each cured product, which is an indication of the amount of crystalline silica that remains (residual content). Surprisingly, with lower amount of reactant having an increased surface area (smaller particle size) in combination with higher amounts of inert filler, the compressive strength was higher (Formulations F3 and F5). Thus, improved reactivity of a reactant in combination with a suitable inert filler provided mechanical attributes to a formed product. In addition, the examples show that filler and reactant content (and reactant size) may each be manipulated in a predetermined manner to arrive at a desired product with desired strength characteristics.

Together, TABLES 1-4 illustrate that enhanced formulations as described herein, form suitable and desired reactions in a mixture when prepared. Such formulations, when cured, 15 also provide desirable strength and durability properties for a cementitious product. In addition, such formulations as described herein offer a substantially low or lower crystalline silica content with reduced residual crystalline silica having comparable or potentially better structural advantages than existing cementitious products formed therefrom.

Accordingly, there are several benefits when using cementitious formulations described herein. Such formulations improve cementitious reactions for matrix formation, enhance reactivity of the reactant (e.g. crystalline silica) during a curing and reduce the residual reactant (e.g. crystalline silica) content in a cured or further cured material, article or product.

In addition or as an alternative embodiment, reactivity in a formulation herein may be enhanced by providing a reactant with a preferred alumina source. As discussed previously, a preferred alumina source may include but is not limited to alumina trihydrate and clay (dehydroxylated or other forms). In one or more embodiments, the alumina source is less than 10 wt. %, or less than 6 wt. %, or less than 4 wt. %. In some embodiments, the alumina source may be less than 3 wt. %.

In further examples, bench scale analyses of filter pads were performed, as previously described, wherein filter pads were prepared using formulations provided in TABLE 5, in which fine grind silica content and/or alumina content was adjusted to provide desired properties. Pads had a dimension of 250 mm×250 mm×8 mm. All formulations were prepared with fine grind crystalline silica ($d_{50}$=13 micron); however the amount of the reactant in Formulations H, I and J was 10 wt. % as compared with greater than 60 wt. % in Formulation G. Thus, the large amount of reactant in Formulation G served as both reactant and filler. Formulations H, I and J were each provided with an additional filler in the form of limestone. The calcium source was the same for all formulations (G to J) provided as Portland cement. The alumina source for all formulations was either hydrated alumina or clay. In this example, clay was in the form of a dehydroxylated clay (metakaolin). Fiber reinforcement in the form of cellulose fibers was the same for all formulations (G to J). Major constituents for each of these formulation are shown in the TABLE 5; all percentage are in dry weight.

TABLE 5

|  | Cement | Fine grind silica | Alumina | Clay | Filler | Fiber |
|---|---|---|---|---|---|---|
| Formulation G | 28.70% | 60.80% | 3.50% | 0.00% | 0.00% | 7.00% |
| Formulation H | 33.70% | 10.00% | 2.00% | 0.00% | 47.30% | 7.00% |
| Formulation I | 33.70% | 10.00% | 0.00% | 2.00% | 47.30% | 7.00% |
| Formulation J | 33.70% | 10.00% | 0.00% | 4.00 | 45.30% | 7.00% |

Formulations G-J were filter-pressed (as previously described with TABLES 2-4) and cured in an autoclave for eight hours at an elevated temperature (170-190 degrees Centigrade). Specimens were evaluated mechanically (3-point flexure) and physically (pre- and postcarbonation moisture movement and density), as described previously. Representative data is shown in TABLE 6, in which data was averaged from at least 3 specimens. The table illustrates that formulations herein provide comparable physical and/or structural properties and each offer improved reactivity (see TABLE 7). Reducing the amount of reactive silica and replacing with a preferred filler may further improve mechanical and physical properties (e.g., strain and moisture movement) and may have little undesirable effect on density of a product produced by said formulations.

TABLE 6

|  | G | H | I | J |
|---|---|---|---|---|
| Saturated ultimate strength (flexure), MPa | 7.20 | 5.90 | 6.70 | 6.40 |
| Saturated ultimate strain (flexure), μm/m | 4009 | 6404 | 5216 | 6482 |
| Moisture movement (pre-carbonation), % | 0.14 | 0.09 | 0.11 | 0.11 |
| Moisture movement (post-carbonation), % | 0.44 | 0.35 | 0.35 | 0.34 |
| Oven dry density, gm/cc | 1.36 | 1.40 | 1.42 | 1.41 |

Analyses for silica reactivity and contents of the matrix for specimens produced from Formulations G, H, I and J (provided as an average of at least 2 or more specimens) are shown in TABLE 7. Procedures used were similar to those described with TABLE 4. The table shows that reactivity was further enhanced by providing an alumina source either in the form of alumina or clay (see formulations H, I, J). Consequently, residual silica was dramatically reduced with enhanced reactivity provided by the alumina source; both alumina and clay as an alumina source, provided desired physical and mechanical properties (see TABLE 5). Addition of an alumina source also allowed for a larger reduction in the amount of initial reactant (e.g., crystalline silica) used in the initial formulation.

TABLE 7

|  | G | H | I | J |
|---|---|---|---|---|
| Average crystalline silica particle size ($d_{50}$), μm | 10.5 | 10.5 | 10.5 | 10.5 |

TABLE 7-continued

|  | G | H | I | J |
|---|---|---|---|---|
| Initial silica before curing, % | | | | |
| Residual silica after curing, % | | | | |
| Reacted silica, % | | | | |
| Silica reactivity | | | | |

The alumina provides a source of oxide for improved reactivity. As an example, in terms of reacted oxide ratios, Formulation H had a Ca/(SiO$_2$+AlO$_3$) weight ratio of 0.91; an Al/[Al+Si] weight ratio of 0.10; a CaO/[Total SiO$_2$] molar ratio of 1.63 and a CaO/[Residual crystalline SiO$_2$] molar ratio of 3.31. Interestingly, Formulation H also had the highest silica reactivity at 70%.

In addition or as an alternative, reactivity in a formulation herein is enhanced by providing a reactant with a preferred filler. As discussed previously, a preferred filler is a material that, itself, is not reactive and, unlike a reactant, does not undergo dissolution. A filler may include calcium carbonate or limestone, clay, expanded perlite, talc, slags, lime, dolomite, slate dust and diabase stone dust.

In further examples, bench scale analyses of physical, structural and chemical/reactive properties of filter pads were performed (as described previously) using Formulations K, L and M. Filter pads were 250 mm×250 mm×8 mm. A control formulation (K) was prepared with a high level of a poor reactant (greater than 60 wt. % medium grind crystalline silica, d$_{50}$=25 micron) which served as both reactant and filler. Formulations L and M were prepared with a reactive pozzolan of fine grind crystalline silica (d$_{50}$=13 micron) and either a filler A of limestone or filler B of air-cooled slag. All formulations had the same calcium source as Portland cement and the same alumina source in the form of hydrated alumina. Alumina was higher in the control formulation (K) because the reactant used is a poor pozzolan. Major constituents for formulations K, L and M are shown in the TABLE 8; all percentage are in dry weight.

TABLE 8

|  | Cement | Medium grind silica | Fine grind silica | Alumina | Filler A | Filler B | Fiber |
|---|---|---|---|---|---|---|---|
| K | 28.70% | 60.80% | 0.00% | 3.50% | 0.00% | 0.00% | 7.00% |
| L | 33.70% | 0.00% | 15.00% | 2.00% | 0.00% | 42.30% | 7.00% |
| M | 33.70% | 0.00% | 15.00% | 2.00% | 42.30% | 0.00% | 7.00% |

Mechanical and physical properties (flexural properties, moisture movement and density) associated with Formulation K, L and M are shown in TABLE 9A. Formulations L and M both provided comparable and desirable properties of strength, strain, moisture movement and density.

TABLE 9A

|  | K | L | M |
|---|---|---|---|
| Saturated ultimate strength (flexure), MPa | 7.83 | 7.08 | 7.40 |
| Saturated ultimate strain (flexure), μm/m | 7038 | 6216 | 4272 |
| Moisture movement (pre-carbonation), % | 0.16 | 0.13 | 0.12 |
| Moisture movement (post-carbonation), % | 0.39 | 0.36 | 0.49 |
| Oven dry density, gm/cc | 1.29 | 1.32 | 1.46 |

Silica reactivity and chemical content of crystalline silica are shown in TABLE 9B. Formulations L and M each provided desirable chemical properties in terms of crystalline silica content and reactivity. As before, silica reactivity was enhanced when an enhanced reactant was provided with an alumina source and a preferred filler (see Formulations L and M). Consequently, the amount of residual silica was greatly reduced with Formulations L and M, in which a preferred filler was used rather than a poor pozzolan, such as medium grind silica.

TABLE 9B

|  | K | L | M |
|---|---|---|---|
| Average crystalline silica particle size (d$_{50}$), μm | 25.0 | 13.0 | 13.0 |
| Initial silica before curing, % | 60.8 | 15.0 | 15.0 |
| Residual silica after curing, % | 54.0 | 6.1 | 9.8 |
| Reacted silica, % | 6.8 | 8.95 | 5.2 |
| Silica reactivity, % | 11.2 | 59.7 | 34.7 |

The formulations described show that formulations herein provide a source of oxide for improved reactivity. As an example, in terms of reacted oxide ratios, Formulation L had a Ca/(SiO$_2$+Al$_2$O$_3$) weight ratio of 0.82; an Al/[Al+Si] weight ratio of 0.08; a CaO/[Total SiO$_2$] molar ratio of 1.43 and a CaO/[Residual crystalline SiO$_2$] molar ratio of 2.59. Formulation L had a high silica reactivity of about 60%.

In addition or as an alternative, reactivity is improved by alkalinity of the formulation. A high reactive silica is typically provided in an aqueous environment with a pH greater than 10, greater than 11, or greater than 12 or 13. A higher alkali environment improves pozzolan activity of the silica enabling increased dissolution, thereby reducing its residual content.

In an example, cementitious formulations were provided as disclosed in TABLE 10A. In all formulations, a water:solids ratio was 1.0. All formulations had the same amount and the same calcium source provided as ordinary cement, the same amount and the same filler provided as limestone, the same amount and the same alumina source provided as alumina hydrate, and the same amount of reactive crystalline silica provided as either fine grind silica (d$_{50}$ of 20.6 micron) or extra fine silica (d$_{50}$ or 7.0 micron). Formulations D7 and E5 were prepared with fresh tapwater. Formulations D8 and E6 were prepared with fresh limewater. Formulations D3 to D6, E3 and E4 were aged, in which slurries were allowed to sit for about four days in limewater. In Formulations D4, D5, D6 and E4, pH was adjusted with sodium hydroxide.

TABLE 10A

|  | Cement | Filler | Fine grind silica | Extra fine grind silica | Alumina | pH | Aged |
|---|---|---|---|---|---|---|---|
| D3 | 35% | 48% | 15% | 0.0% | 2.0% | 10.3 | Yes |
| D4 | 35% | 48% | 15% | 0.0% | 2.0% | 11.3 | Yes |
| D5 | 35% | 48% | 15% | 0.0% | 2.0% | 12.3 | Yes |
| D6 | 35% | 48% | 15% | 0.0% | 2.0% | 13.3 | Yes |
| D7 | 35% | 48% | 15% | 0.0% | 2.0% |  | No |
| D8 | 35% | 48% | 15% | 0.0% | 2.0% |  | No |
| E3 | 35% | 48% | 0.0% | 15% | 2.0% | 11.3 | Yes |
| E4 | 35% | 48% | 0.0% | 15% | 2.0% | 13.3 | Yes |
| E5 | 35% | 48% | 0.0% | 15% | 2.0% |  | No |
| E6 | 355 | 48% | 0.0% | 15% | 42.30% |  | No |

Strength and residual silica content were determined as described previously. Data is provided in TABLE 10B showing maintenance of strength at higher pH levels and reduction in residual silica reactivity with a higher pH.

TABLE 10B

| | D3 | D4 | D5 | D6 | D7 | D8 | E3 | E4 | E5 | E6 |
|---|---|---|---|---|---|---|---|---|---|---|
| Strength, mPa | 11.4 | 11.8 | 10.3 | 8.9 | 12.2 | 11.9 | 8.7 | 7.8 | 15.5 | 14.1 |
| Residual, silica, % | 4.3 | 4.8 | 5.1 | 3.6 | 6.2 | 5.5 | 4.0 | 2.7 | 6.0 | 5.2 |

In addition or as an alternative, reactivity and dissolution of the reactant is enhanced with formulations having a reactant and one or more catalysts. A catalyst, as described herein, is an organic or inorganic compound that lowers activation energy of the reactant to promote its reactivity as a pozzolan and enhance surface reactivity with the calcium source. Catalysts may be of a first group that withdraw electrons from the reactant (e.g., silica) thereby reducing electron density and reducing bond strength (e.g., Si—O bond). Suitable electron withdrawing catalysts are chloride salts, such as a chloride of calcium (CaCl), ammonium ($NH_4Cl$), lithium calcium (LiCl), nickel ($NiCl_2$), and other alkaline earth metal and alkali chlorites, as examples.

A second group of suitable catalysts are electron donors that donate one or more electrons to a reactant (e.g., silica) and when combined with electron movements in neighboring hydroxide ions (OH, also referred to hydroxide jumping) weaken bond strength of the reactant (e.g., Si—O). Examples of electron donating catalysts are hydroxides (e.g., potassium hydroxide [KOH], lithium oxide [LiOH], sodium hydroxide [NaOH]), and various sodium-, potassium- and lithium-containing catalysts, such as sodium fluoride (NaF), sodium carbonate ($NaCO_3$), sodium sulfate ($Na_2SO_4$), sodium isocyanate (NaSCN), sodium silicate, lithium carbonate ($Li_2CO_3$), lithium chloride (LiCl), lithium silicate as well as other soluble hydroxides, fluorides and isocyanates.

Electron withdrawing catalysts are typically provided when a formulation includes a reactant and a calcium source. Electron donating catalysts are typically provided when a formulation includes a reactant with an alumina source and a calcium source (e.g., calcium oxide or a calcium containing hydraulic binder). Both types of catalysts have sensitivity to temperature, reduce reaction time, reduce initial reactant content and residual reactant content. Catalyst content in a formulation (based on total dry ingredients) is typically less than 10% and may be less than 4%, or less than 3% and may be less than 2%. A catalyst may be provided in combination with a defoamer (e.g., dispersing agent) to improve overall activity and reduce bubble formation in the formulation under hydrothermal conditions. Addition of a catalyst in a cementitious formulation described herein promotes a reduction in residual silica content after a curing and does not require that the surface area of the silica initially added to the formulation be substantially reduced. In one form, clay may also behave similar to a catalyst.

An example of catalyst behavior is shown in TABLE 11A. Formulations O to V were prepared with an enhanced reactant (reactant and catalyst) and residual reactant content was assessed as compared with a control formulation (N) having a poor pozzolan as a reactant, which was medium grind quartz silica (350 $m^2$/kg Blaine; $d_{50}$ of 25 micron) at 60 wt. % (based on total dry ingredients). Residual silica content was reduced, typically by about 40%, 50% or more in all desirable formulations (O to V). In said Formulations (O to V), the reactant was fine grind quartz silica (700 $m^2$/kg Blaine; $d_{50}$ of 13 micron) at 40 wt. %. All formulations had the same calcium source provided as cement; comparative formulations also included an alumina source provided in the same amount as $AH_3$. Each comparative formulation included a different catalyst. All formulations were hydrated with water and cured under the same hydrothermal condition before determining residual silica content. Residual silica content was determined as previously described using XRD, straight line calibration and standard addition methods.

TABLE 11A

| Initial Content (silica wt. %) | Catalyst | Residual Content (silica wt. %) |
|---|---|---|
| O (40) vs. N (60) | $Li_2CO_3$ | O (2.4) vs. N (6.9) |
| P (40) vs. N (60) | LiOH | P (2.7) vs. N (6.2) |
| Q (40) vs. N (60) | $Na_2CO_3$ | Q (2.4) vs. N (6.2) |
| R (40) vs. N (60) | NaOH | R (2.9) vs. N (6.2) |
| S (40) vs. N (60) | KOH | S (3.8) vs. N (6.2) |
| T (40) vs. N (60) | $Na_2SO_4$ | T (3.7) vs. N (6.0) |
| U (40) vs. N (60) | $NiCl_2$ | U (4.0) vs. N (6.9) |
| V (40) vs. N (60) | LiCl | V (4.7) vs. N (6.9) |

TABLE 11B shows that temperature has an effect on catalyst activation of a reactant described herein. Moreover, reaction time (as cure time) is significantly reduced by a catalyst as seen in TABLE 11B, in which cure time is reduced from 8 hours to just 3.5 hours at a temperature of 188 degrees Centigrade. In fact, residual silica content was reduced significantly (by more than 50%) with only a 15 degree rise in temperature and a greater than 65% decrease in cure time (see values at 173 degrees as compared with 188 degrees Centigrade). With an additional 7 degree rise in temperature (see values at 188 degrees as compared with 195 degrees) the residual silica content becomes undetectable. As such, a catalyst appears to reduce the time to reach a peak temperature, which is a measure for hydrothermal curing. In TABLE 11B, residual silica content was undetectable by 195 degrees Centigrade in a formulation described herein (W) while not detected until 295 degrees Centigrade in the control formulation. At temperatures greater than about 188 degrees Centigrade, residual silica content was negligible or undetectable in a formulation (W) having a reactant of fine grind quartz silica (700 $m^2$/kg Blaine; $d_{50}$ of 13 micron) at 40 wt. % (based on total dry ingredients) and a catalyst of $Li_2CO_3$ (at 1.3 wt. %). Formulation W (with catalyst) was compared with a control formulation (without catalyst), both having the same particle size and content of medium grind silica (350 m2/kg Blaine, $d_{50}$ of 25 micron) at 60 wt. %. All formulations included ordinary cement as a calcium source and AH3 as an alumina source.

TABLE 11B

| Temperature (in degrees C.) | Cure time (in hours) | Control Residual Content (%) | Formulation W Residual Content (%) |
|---|---|---|---|
| 173 | 8 | 6.9 | 2.4 |
| 188 | 3.5 | 12.8 | 1.2 |
| 195 | 3.5 | 6.5 | 0.0 |
| 197 | 3.5 | 5.4 | 0.0 |
| 207 | 3.5 | 5.3 | 0.0 |
| 209 | 3.5 | 2.2 | 0.0 |
| 211 | 3.5 | 1.75 | 0.0 |

TABLE 11B-continued

| Temperature (in degrees C.) | Cure time (in hours) | Control Residual Content (%) | Formulation W Residual Content (%) |
|---|---|---|---|
| 227 | 3.5 | .014 | 0.0 |
| 234 | 3.5 | 0.0 | 0.0 |

As with other examples described, catalysts enhance reactivity regardless of whether the formulation is a slurry or paste (data not shown). Examples of enhanced reactivity by addition of an electron withdrawing catalyst (e.g., chloride-containing catalyst) are depicted in TABLE 12A in Formulations Y and Z, TABLE 12B in Formulations BB and CC and DD and TABLE 12C in Formulations EE and FF.

Referring to TABLE 12A, formulations were prepared as dry ingredients with a reactant (in the form of crystalline silica having a $d_{50}$ of 1.6 micron), a catalyst and a calcium source in the form of calcium hydroxide. The reactant and calcium source were provided in a 1:1 ratio (dry weight basis), the catalyst was added in the amount shown in the table. Together, the dry components were mixed in a 1:3 ratio (wt/volume) with water to form a reaction mixture. A control formulation (X) included a reaction mixture with the same calcium source and reactant without a catalyst. Each reaction mixture was further mixed for about thirty minutes to form a homogenous slurry and transferred to a vessel and treated hydrothermally at about 180 degrees Centigrade for 16 hours. The autoclaved mix was discharged to a glass beaker and dried at 60° C. overnight. When dried, the powder was ground with a grinder for about 2 minutes and loaded on a sample holder for X-ray diffraction (XRD) analyses to identify crystalline silica content. The diffractometer was set at 45 kV and 40 mA with a scan condition of 0.02° step size and 1 second per step. Silica content was determined by using a straight line calibration method known to one of ordinary skill in the art. Catalysts were provided as dry ingredients and given as a weight percent.

TABLE 12A

| | Catalyst | Catalyst Amount | Residual Content (%) |
|---|---|---|---|
| Formulation X | — | — | 3.7 |
| Formulation Y | CaCl$_2$ | 2.0 | 0.4 |
| Formulation Z | NH$_4$Cl | 1.0 | 1.0 |

TABLE 12A shows chloride containing catalysts improve reactivity and reduce residual silica content and a matrix formed by a formulation described herein. Calcium chloride (Formulation Y) reduced residual silica content by 936% as compared with the control formulation (X); ammonium chloride (Formulation Z) reduced residual silica content by 90% as compared with the control formulation (X).

Formulations in TABLE 12B were prepared as dry ingredients with the same reactant (crystalline silica having a $d_{50}$ of 13 micron) at about 40 wt. %, a catalyst (except Formulation AA), a calcium source in the form of calcium hydroxide at about 60 wt. % and an alumina source in the form of alumina hydrate at about 3 wt. %. Together, the dry components were mixed with water to form a reaction mixture in a slurry. Each reaction mixture was further mixed for about thirty seconds, transferred to a vessel and treated hydrothermally at about 170 degrees Centigrade for 8 hours followed by overnight drying at about 60° C. When dried, the powder was ground for about 2 minutes and analyzed by XRD using similar setting and calibration as described previously.

For Formulations BB and CC, catalysts were provided as a dry ingredient and given as a weight percent in TABLE 12B. Both Formulations BB and CC showed that including a catalyst in the formulation improved reactivity of the crystalline silica reactant by at least 47% as compared with a formulation absent a catalyst.

TABLE 12B

| | Catalyst | Catalyst Amount | Residual Content (%) |
|---|---|---|---|
| Formulation AA | — | — | 6.9 |
| Formulation BB | NiCl$_2$ | 2.35 | 4.0 |
| Formulation CC | LiCl | 0.77 | 4.7 |

Formulations for TABLE 12C were prepared with the same reactant (crystalline silica having a $d_{50}$ of 7.0 micron) at about 16 wt. %, a catalyst (except Formulation DD), a calcium source in the form of Portland cement at about 35 wt. %, an alumina source in the form of alumina hydrate at about 2 wt. %, and a filler in the form of calcium carbonate (with a $d_{50}$ of about 25 micron) at about 42 wt. %. Together, the dry components were mixed with lime water to form a reaction mixture in a slurry and processed as described previously with TABLE 12B. Reactivity was assessed by XRD as described previously and found to be improved in all formulations having a catalyst as compared with a formulation lacking a catalyst.

TABLE 12C

| | Catalyst | Catalyst Amount | Residual Content (%) |
|---|---|---|---|
| Formulation DD | — | — | 5.0 |
| Formulation EE | NaCl | 4.1 | 3.9 |
| Formulation FF | NiCl$_2$ | 4.6 | 4.6 |

Electron donating catalysts (e.g., OK and Na-, K- and Li-containing catalyst) also greatly improve reactivity of a reactant in formulations described herein. Examples are depicted in TABLES 13A-13G. Formulations were prepared as either a slurry/paste (using a method similar to that described with TABLES 12A-C) or formed into filter cakes (TABLES 13C and 13D) or filter pads (TABLES 13E, 13F and 13G).

Formulations in TABLE 13A were prepared as described for TABLE 12B. Dry ingredients included the same reactant (crystalline silica having a $d_{50}$ of 13 micron) at about 40 wt. %, a catalyst (except Formulation GG), a calcium source in the form of calcium hydroxide at about 60 wt. % and an alumina source in the form of alumina hydrate at about 3 wt. %. Together, the dry components were mixed with water to form a reaction mixture in a slurry. Each reaction mixture was further mixed for about thirty seconds, transferred to a vessel and treated hydrothermally at about 170 degrees Centigrade for 8 hours followed by overnight drying at about 60° C. When dried, the powder was ground for about 2 minutes and analyzed by XRD using a setting and calibration as described previously. All formulations (HH to MM) showed that a catalyst improved reactivity of the crystalline silica reactant in a formulation described herein. Reactivity was improved by at least 80% or greater as compared with a formulation absent a catalyst. Li$_2$CO$_3$ increased reactivity by 186%; LiOH increased reactivity by 157%; Na$_2$CO$_3$ increased reactivity by 183%; NaOH increased reactivity by 140%; KOH increased reactivity by 82%; Na$_2$SO$_4$ increased reactivity by 88%.

TABLE 13A

| | Catalyst | Catalyst Amount | Residual Content (%) |
|---|---|---|---|
| Formulation GG | — | — | 6.9 |
| Formulation HH | $Li_2CO_3$ | 1.33 | 2.4 |
| Formulation II | LiOH | 1.72 | 2.7 |
| Formulation JJ | $Na_2CO_3$ | 3.82 | 2.4 |
| Formulation KK | NaOH | 2.77 | 2.9 |
| Formulation LL | KOH | 2.03 | 3.8 |
| Formulation MM | $Na_2SO_4$ | 2.62 | 3.7 |

Formulations for TABLE 13B were prepared as described with TABLE 12C. Each formulation included the same reactant (crystalline silica having a $d_{50}$ of 7.0 micron) at about 16 wt. %, a catalyst (except Formulation NN), a calcium source in the form of Portland cement at about 35 wt. %, an alumina source in the form of alumina hydrate at about 2 wt. %, and a filler in the form of calcium carbonate (with a $d_{50}$ of about 25 micron) at about 42 wt. %. Dry components were mixed with lime water to form a reaction mixture in a slurry. Formulations were further processed and analyzed by XRD as described with TABLE 12C. Reactivity was improved in all formulations having a catalyst as compared with a formulation lacking a catalyst (NN). $Li_2CO_3$ increased reactivity by 85%; LiOH increased reactivity by 67%; potassium silicate (e.g., KASIL-6, a registered trademark of PQ Corporation, Philadelphia, Pa.) increased reactivity by 300%; type D sodium silicate increased reactivity by 163%; 8-K, Li silicate increased reactivity by 92%; 25-Li silicate increased reactivity by 47%; NaOH increased reactivity by 35%.

TABLE 13B

| | Catalyst | Catalyst Amount | Residual Content (%) |
|---|---|---|---|
| Formulation NN | — | — | 5.0 |
| Formulation OO | $Li_2CO_3$ | 1.3 | 2.7 |
| Formulation PP | LiOH | 8.3 | 3.0 |
| Formulation QQ | $K_2SiO_3$ | 3.2 | 1.3 |
| Formulation RR | $Na_2SiO_3$ (D-type) | 4.1 | 1.9 |
| Formulation SS | 8-K, Li silicate | 4.1 | 2.6 |
| Formulation TT | 25-Li silicate | 51 | 3.4 |
| Formulation UU | NaOH | 3.3 | 3.7 |

For TABLE 13C, filter cakes were prepared with a basic formulation including (on a dry basis) a reactant (crystalline silica having a $d_{50}$ of 7.0 micron) at about 13 wt. %, a catalyst (except Formulation VV), a calcium source in the form of Portland cement at about 35 wt. %, an alumina source in the form of alumina hydrate at about 2 wt. %, and a filler in the form of calcium carbonate (with a $d_{50}$ of about 25 micron) at about 50 wt. %. Formulations YY and A3 also included clay at 1 wt. % and Formulations ZZ and B3 included clay at 2 wt. %. Dry components were mixed together by hand and limewater was added to form a reaction mixture in a cake slurry which was then mechanically stirred for another minute. The cake slurry was poured into a funnel with a 541 filter paper and vacuum filtered until its surface was free of liquid. Each filter cake had a diameter of about 4 inches and were about 1 inch thick. Cakes were cured at room temperature for about 18 to 24 hours and then further cured at greater than 270° C. for 8 hours. After a curing, each cake was soaked in water at room temperature for about 48 hours and then cut into half-inch cubes, a portion of which were used for compressive strength testing, relying on at least 6 cubes for each compressive strength analyses shown in the table. A remaining portion of each cake was dried overnight, at 105 degrees Centigrade and analyzed for residual crystalline silica content by XRD as described previously. For compressive strength assessment, specimens were placed between opposing plates connected to a mechanical device able to apply a controlled closing force. As plates closed, a resistance force is provided by the material until fracture, after which resistance ends. Compressive strength is the maximum resistance force.

All catalyst-containing formulations in TABLE 13C were found to enhance reactivity of the reactant and greatly reduce residual silica content in the formed cementitious matrix. In addition, formulations could be specifically altered as desired to manipulate structural properties (e.g., compressive strength) of the formed article.

TABLE 13C

| | Catalyst | Catalyst Amount | Residual Content (%) | Compressive Strength (MPa) |
|---|---|---|---|---|
| Formulation VV | — | — | 3.8 | 26.5 |
| Formulation WW | $K_2SiO_3$ | 2.0 | 3.1 | 12.9 |
| Formulation XX | $Na_2SiO_3$ (D-type) | 2.0 | 3.5 | 22.2 |
| Formulation YY | $K_2SiO_3$ | 2.0 | 2.7 | 12.3 |
| Formulation ZZ | $K_2SiO_3$ | 2.0 | 2.7 | 15.4 |
| Formulation A3 | $Na_2SiO_3$ (D-type) | 2.0 | 3.26 | 21.2 |
| Formulation B3 | $Na_2SiO_3$ (D-type) | 2.0 | 3.14 | 18.6 |

For TABLE 13D, filter cakes were prepared as described with TABLE 13C, each having a basic formulation that included (on a dry basis) a reactant (quartz sand having a $d_{50}$ of at or about 13 micron) at about 45 wt. %, a catalyst (except Formulation C3), a calcium source in the form of Portland cement at about 40 wt. %, no alumina source, and a filler in the form of calcium carbonate (with a $d_{50}$ of about 25 micron) at about 45 wt. %. To the catalyst containing formulations (E3, F3, G3), varying amounts of a defoamer were included at a wt. % of 0.17, 0.67 and 1.33, respectively. For all formulations, a quartz slurry was first milled to achieve the desired particle size and to it were added the additional ingredients in dry form. The dry weight of the slurry was in a 1:1 ratio with water (wt/volume). The slurry was then funneled and prepared into cakes as described for TABLE 13e. Cut cubes were used for compressive strength analysis and residual silica content by XRD.

All catalyst-containing formulations in TABLE 13D were found to greatly enhance reactivity of the reactant by at least 50% and greatly reduce residual silica content in the formed cementitious matrix. Addition of a defoamer improved compressive strength. For example, milling the sand and adding a catalyst increased reactivity by 53% and reduced cake strength by 29%. Soaking the reactant with catalyst in the presence of a 0.17% defoamer, increased reactivity by 83% and increased cake strength. As such, formulations herein may be specifically altered as desired to manipulate structural properties (e.g., compressive strength) of a formed cementitious article.

TABLE 13D

| | Catalyst | Catalyst Amount | Residual Content (%) | Compressive Strength (MPa) |
|---|---|---|---|---|
| Formulation C3 | — | — | 1.4 | 17.2 |
| Formulation D3 | $Li_2CO_3$ | 1.13 | 0.67 | 12.2 |
| Formulation E3 | $Li_2CO_3$ | 1.13 | 0.24 | 26.3 |
| Formulation F3 | $Li_2CO_3$ | 1.13 | 0.25 | 17.5 |
| Formulation G3 | $Li_2CO_3$ | 1.13 | 0.07 | 17.1 |

For TABLE 13E, filter pads were prepared for evaluation, each having a basic formulation that included (on a dry basis)

a reactant (crystalline silica having a $d_{50}$ of 13 micron) at about 15 wt. %, a catalyst (except Formulation H3), a calcium source in the form of Portland cement at about 30 wt. %, an alumina source in the form of alumina hydrate at about 2 wt. %, a filler in the form of calcium carbonate (with a $d_{50}$ of about 25 micron) at about 42 wt. % and fiber reinforcement in the form of cellulose fibers at 7 wt. %. For all formulations, cement, alumina, reactant and additive components were mixed in dry form. To this mixture was added paper fiber that had been soaked in limewater with a water to solid ratio of about 0.5. The fiber cement mixture was mixed for 10 minutes to form a slurry and added to a steel frame mold and supported within with steel wire mesh screens on top and bottom (30 to 40 US mesh). The mixture was then compressed between two steel dewatering plates at 3500 psi for one minute with a suitable press to form a monolithic 10"×10" sheet with a thickness of about 8 mm. The sheet was pre-cured for at least about 12 hours and autoclaved at an elevated temperature (greater than 270° C.) in a steam saturated environment with pressure for about 8 hours. After a curing, the sheet was cut into specimens of 150 mm×150 mm and soaked in water for about 24 hours to 48 hours before performing mechanical testing for modulus of rupture (MOR) and modulus of elasticity (MoE) on saturated specimens; analysis was similar to that previously described for three-point bending using a suitable MTS machine. Another portion of each pad was dried at 105° C. overnight, ground into a powder and analyzed for residual silica content by XRD.

For MOR and MOE, saturated specimens of about 170 mm×8 mm (on square) were applied to a three point bend test. Briefly, a specimen was placed on two cylindrical supports and a force applied at its center to cause bending until failure. The applied force and the deflection of the sample for incremental force application were measured. The modulus of rupture (MOR) and the modulus of elasticity (MOE) for rectangular plates were calculated from formulae known to one of ordinary skill in the art.

With the exception of NaOH, catalysts in TABLE 13D generally enhanced reactivity and reduced residual crystalline silica content in the matrix after formation as shown. NaOH may be less effective due to its higher solubility. In addition, mechanical properties (e.g., MOR or MoE) of the formed material were altered indicating that formulations described herein may be manipulated as desired and are useful for preparing a cementitious article.

TABLE 13E

| | Catalyst | Catalyst Amount | Residual Content (%) | MOR (MPa) | MoE (MPa) |
|---|---|---|---|---|---|
| Formulation H3 | — | — | 7.5 | 5.67 | 3.31 |
| Formulation I3 | KOH | 2.1 | 5.5 | 5.45 | 3.62 |
| Formulation J3 | NaOH | 1.5 | 7.6 | 5.16 | 3.33 |
| Formulation K3 | LiOH | .9 | 5.8 | 5.67 | 3.25 |
| Formulation L3 | $K_2SiO_3$ | 3.0 | 5.8 | 4.94 | 2.34 |
| Formulation M3 | $Na_2SiO_3$ (D-type) | 3.0 | 6.1 | 4.98 | 2.06 |
| Formulation N3 | $Lki_2SiO_3$ | 3.0 | 6.8 | 4.66 | 2.32 |

Similar to the filter pad preparation described with TABLE 13E, additional filter pads were made with a basic formulation that included (on a dry basis) a reactant (crystalline silica having a $d_{50}$ of 7 micron) at about 15 wt. %, a catalyst (except Formulation O3), a calcium source in the form of Portland cement at about 30 wt. %, an alumina source in the form of alumina hydrate at about 2 wt. %, a filler in the form of calcium carbonate (with a $d_{50}$ of about 25 micron) at about 42 wt. % and fiber reinforcement in the form of cellulose fibers at 7 wt. % as depicted in TABLE 13F. Saturated pad specimens were mechanically tested for modulus of rupture (MOR) and modulus of elasticity (MoE) and for residual silica content by XRD as described with TABLE 13E.

Catalysts in TABLE 13F enhanced reactivity and reduced residual crystalline silica content in the formed matrix. In addition, mechanical properties (e.g., MOR or MoE) of the formed material were altered, indicating that formulations described herein may be manipulated as desired and are useful for preparing a cementitious article.

TABLE 13F

| | Catalyst | Catalyst Amount | Residual Content (%) | MOR (MPa) | MoE (MPa) |
|---|---|---|---|---|---|
| Formulation O3 | — | — | 6.3 | 5.4 | 3.12 |
| Formulation P3 | LiOH | .9 | 4.7 | 3.7 | 2.56 |
| Formulation Q3 | $Na_2SiO_3$ (D-type) | 2.0 | 5.9 | 4.56 | 2.57 |

The same general formulation described with TABLE 13F was used for preparing formulations in TABLE 13G, except the reactant (crystalline silica having a $d_{50}$ of 7 micron) was provided at 10 wt. %. All formulations included a catalyst (except Formulation R3) in addition to a filler in the form of calcium carbonate (with a $d_{50}$ of about 25 micron) at about 42 wt. % and fiber reinforcement in the form of cellulose fibers at 7 wt. % (TABLE 13F). Formulation X3 also included clay at 2 wt. %. Saturated pad specimens were mechanically tested for modulus of rupture (MOR) and modulus of elasticity (MoE) and for residual silica content by XRD.

All catalysts in TABLE 13G enhanced reactivity and reduced crystalline silica content in the formed matrix after a curing. In addition, mechanical properties (e.g., MOR or MoE) of the formed material were altered indicating that formulations described herein may be manipulated as desired and are useful for preparing a cementitious article.

TABLE 13G

| | Catalyst | Catalyst Amount | Residual Content (%) | MOR (MPa) | MoE (MPa) |
|---|---|---|---|---|---|
| Formulation R3 | — | — | 4.5 | 5.65 | 2.39 |
| Formulation S3 | LiOH | .9 | 3.2 | 4.57 | 2.64 |
| Formulation T3 | NaOH | 1.5 | 3.7 | 4.86 | 2.92 |
| Formulation U3 | KOH | 2.1 | 3.9 | 5.05 | 2.82 |
| Formulation V3 | $Na_2SiO_3$ (D-type) | 2.0 | 3.7 | 5.59 | 2.14 |
| Formulation W3 | $K_2SiO_3$ | 2.0 | 3.4 | 6.11 | 2.77 |
| Formulation X3 | $K_2SiO_3$ | 2.0 | 4.1 | 5.67 | 2.65 |

From TABLES 13E-13G, there were several findings. For example, LiOH and KOH were effective at increasing reactivity of crystalline silica; both catalysts generally maintain pad strength as compared with a control formulation lacking a catalyst. NaOH, while often doing only very little to enhance reactivity, maintained strength of a cementitious article. Potassium silicates (e.g., Kasil-1) increased reactivity and reduced strength. A D-type of sodium silicate increased reactivity and decreased or maintained strength, as did lithium silicate. Clay (e.g., montmorillonite clay) enhanced catalyst activity and, hence, silica reactivity; clay improved activity of potassium silicate yet maintained or reduced strength of cement cakes. Clay improved activity of sodium silicate and maintained strength of formed cement cakes; adding additional clay, while further increasing reactivity of silica, did not further strengthen the formed cement articles.

Clay may act as an additive for catalyst activity and/or as a type of catalyst. In addition, and in some embodiments, clay may be a source of silica and $SiO_2$. Clays are typically comprised of about 2% to as much as 30% crystalline silica. Clays reacts with cement when provided as a calcium source as shown in TABLE 14, in which Formulations Y1 and Y2 include clay with a low silica content (e.g., bentonite clay). The clay was provided as a reactant and added either in the initial formulation (Y1) or after a curing (Y2). For Y1, the mixture of dry ingredients were added to water, mechanically mixed and strained through a wire mesh at a pressure of about 0.3 tons/square inch (until a resulting mix was approximately 30 parts water and 70 parts solid). The mix was then subjected to a hydrothermal curing (with steam up to temperatures of about 170° C. for about 8 hours). Dried articles were cooled to room temperature and evaluated by XRD (see TABLE 15). For Formulation Y2, clay was excluded from the initial mixture and added as a dry ingredient only after a curing and before XRD analysis. Under such conditions, clay does not typically react at room temperature, thus serving as a control. Each formulation included a calcium source as ordinary cement, a filler of course limestone (using a 200 mesh), the same amount of clay in the form of bentonite clay and fiber reinforcement in the form of cellulose fibers provided as refined pulp.

TABLE 14

|  | Formulation Y1 | Formulation Y2 |
| --- | --- | --- |
| Cement | 28.5 parts | 28.5 parts |
| Fiber | 7.0 parts | 7.0 parts |
| Coarse filler | 32.35 parts | 32.25 parts |
| Water | 175.0 parts | 175.0 parts |
| Clay (pre-cure) | 32.25 parts | 0.0 parts |
| Clay (post-cure) | 0.0 parts | 32.25 parts |

TABLE 15 shows that tobermorite formed with Y1 and was absent in Y2, while calcium hydroxide (e.g., Portlandite) and montmorillonite (an original clay phase) formed in Y2 indicating this formulation lacked sufficient reaction time for tobermorite formation. Clearly, Y1 shows that a clay with only a small amount of free quartz silica is sufficient to form a suitable reaction and form an important calcium silicate hydrate phase of tobermorite.

TABLE 15

|  | Formulation Y1 | Formulation Y2 |
| --- | --- | --- |
| Quartz | Weak | Strong |
| Tobermorite | Strong | Negligible |
| Calcium hydroxide | None Observed | Strong |
| Montmorillonite | Negligible | Strong |
| Calcite | Strong | Strong |

In another example, clay was provided as a reactant in various formulations in which the clay had a higher crystalline silica content. In TABLE 16, in the form of kaolin clay having a crystalline silica at about 30% was added in various quantities (adjusted in relation to the calcium source provided as Portland cement in order that the combination achieved 100 parts). Formulations of TABLE 16 were processed as described for TABLE 14.

TABLE 16

|  | Z2 | Z4 | Z5 | Z6 | Z7 | Z8 |
| --- | --- | --- | --- | --- | --- | --- |
| Cement | 0 parts | 25 parts | 37.5 parts | 50 parts | 62.5 parts | 75 parts |
| Clay | 100 parts | 75 parts | 62.5 parts | 50 parts | 37.5 parts | 25 parts |
| Water | 50 parts | 50 parts | 50 parts | 50 parts | 50 parts | 50 parts |

TABLE 17 shows phases identified by XRD in formulations of TABLE 16. Clay alone was a poor pozzolan resulting in a poorly formed matrix with no tobermorite formation. When provided in a formulation described herein, in which clay was provided as a reactant with a calcium source, clay becomes an excellent pozzolan. In fact, increased phases of tobermorite and hydrogarnet were found when clay was suitably provided with a calcium source. At a ratio (by weight) of cement to natural clay of 1:1, 2:1 and 3:1, the formed matrix was predominantly tobermorite and hydrogarnet. When ratios of cement to natural clay were greater than 2:1 or at or greater than 3:1, the residual clay content in the formed matrix reached an undetectable level. As found herein, increased reactivity reduced residual clay content in the formed matrix (e.g., via increased reaction between calcium source and clay).

TABLE 16

|  | Z2 | Z4 | Z5 | Z6 | Z7 | Z8 |
| --- | --- | --- | --- | --- | --- | --- |
| Quartz | Weak | Weak | Weak | Weak | Weak | Weak |
| Tobermorite | None | Weak | Weak | Strong | Strong | Strong |
| Hydrogarnet | None | Weak | Strong | Strong | Strong | Strong |
| Residual clay remaining, % by wt | 100 | 62 | 48 | 22 | 10 | ~0 |

An additional advantage of certain clays is that many include alumina as an alumino silicate structure (e.g., kaolinite clay). As such, clay may be provided as a source of a silica-containing reactant in a reaction with a calcium source. Additional additives such as a filler and an alumina source may also be provided m certain embodiments of desired cementitious formulations as appropriate.

Referring to TABLE 18, three formulations were prepared with clay provided as a silica-containing reactant with a calcium source, an alumina source and a filler. In each formulation (A4, AS and A6), the clay content was counter balanced with a first filler (Filler A) in the form of course limestone (passed through a 200 mesh). Clay served as the reactant for Formulations A4, AS and A6. Clay was absent in Formulation A3, which served as a control formulation in which the reactant was provided as coarse silica sand (through a 200 mesh) at about 60 wt. %. Because of the high reactant content in Formulation A3, the reactant served as both filler and reactant and no additional filler was included. However, to Formulation A3 an alumina source in the form of alumina hydrate was added so all formulations were provided with an alumina source. All formulations included a calcium source in the form of ordinary cement and fiber reinforcement in the form of cellulose fibers from refined cellulose pulp. Components were added in a dry form, mixed with water using a mechanical mixer and then strained through a wire mesh under pressure of about 0.3 tons/square inch to remove excess water and achieve a composition that was approximately 30 parts water and 70 parts solid.

TABLE 18

|  | A3 | A4 | A5 | A6 |
|---|---|---|---|---|
| Cement | 28.7 parts | 28.7 parts | 28.7 parts | 28.7 parts |
| Fiber | 7.0 parts | 7.0 parts | 7.0 parts | 7.0 parts |
| Filler A | 0 parts | 54.3 parts | 49.3 parts | 44.3 parts |
| Filler B | 60.8 parts | 0 parts | 0 parts | 0 parts |
| Alumina | 3.5 parts | 0 parts | 0 parts | 0 parts |
| Clay | 0 parts | 10.0 parts | 15.0 parts | 20.0 parts |
| Water | 175.0 parts | 175.0 parts | 175.0 parts | 175.0 parts |

The cementitious formulations of TABLE 18 were cured as described with TABLE 14 and analyzed for residual quartz content using acid insoluble residue technique and quantitative X-ray diffraction to reveal unreacted silica content. Additionally, a portion of each cured product was evaluated for saturated ultimate strength and saturated ultimate strain, both in flexure mode (using a three point bend analysis as described previously), as well as moisture movement before and after carbonation (TABLE 19). TABLE 19 shows that a clay as a reactant provides comparable if not better structural properties to a cementitious product than silica sand with alumina trihydrate. Moreover, formulations with clay have a high reactivity such that matrices formed therefrom have a very low and/or negligible residual quartz content. Clay to filler ratios may be adjusted as desired to attain desirable structural and or chemical properties of the matrix. As such, formulations herein with clay as a reactant may be a preferred replacement for cementitious formulations previously made with silica sand. Indeed, clay with a calcium source and a filler maintain or exceed chemical and mechanical properties in a product formed therefrom as compared with a composition in which clay is substitute with a lesser reactant (see Formulation A3).

TABLE 19

|  | A3 | A4 | A5 | A6 |
|---|---|---|---|---|
| Residual quartz content, wt. % | 38.29 | 0.36 | 1.15 | 2.15 |
| Saturated ultimate flexural strength, MPa | 7.64 | 5.66 | 8.18 | 9.79 |
| Saturated ultimate flexural strain, μm./m | 4616 | 9415 | 7498 | 7796 |
| Pre-carbonation moisture movement, % | 0.19 | 0.15 | 0.17 | 0.19 |
| Post-carbonation moisture movement, % | 0.49 | 0.37 | 0.43 | 0.42 |

Similar, in at least one form, to the behavior of a catalyst, clay, will enhance reactivity of a reaction involving a calcium source for formulations described herein. This occurs when clay is provided as a reactant and as an additive to accelerate reactivity. Clay not only enhances reactivity, it reduces reaction time (as cure time) of a cementitious formulation under hydrothermal conditions and reduces the time to peak temperature during a hydrothermal curing. Examples of this are provided in TABLES 19 and 20.

Referring to TABLE 19, clay as an accelerant for improving reactivity of a formulation is provided with Formulation B4 as compared with a similar formulation without clay (B3). In both formulations, the reactant was provided as sand ($d_{50}$ of about 20 μm) and the calcium source was ordinary cement; an accelerating agent in the form of a commercial high range water reducer was also added to both formulations to accelerate the reaction in both. All amounts in TABLES 19 and 20 are provided as parts per weight. For TABLE 20, Formulations B6 to B8 included one of 2 different accelerants: clay (B6 and B7) or a commercial high range water reducer (B8); all accelerants were added to provide the same parts by weight. These three formulations were compared with a control formulation (B5) that contained no accelerant. All formulations in TABLE 20 had the same calcium source in the same amount, which was ordinary Portland cement, the same filler as course limestone in the same amount, the same fiber reinforcement in the form of cellulose pulp and the same amount of an additive in the form of a process aid. The reactant in all such formulations was also the same and in the form of sand ($d_{50}$ of about 20/-lm).

For all formulations in TABLES 19 and 20, clay was in the form of montmorillonite clay. All ingredients were then mixed to form a slurry and placed in an adiabatic calorimeter and the time to reach a maximum temperature (T) as well as the maximum temperature of the reaction (within the first 48 hours) were recorded. TABLE 20 shows that reaction rate was faster and peak temperature slightly lower for a formulation having an improved reactant described herein (e.g., clay).

TABLE 20

|  | Formulation B3 | Formulation B4 |
|---|---|---|
| Cement | 20.0 | 20.0 |
| Sand | 80.0 | 80.0 |
| Clay | 0 | 5.0 |
| Water | 8.5 | 8.5 |
| Water reducer | 0.3 | 0.3 |
| Time to maximum T, hours | 31.33 | 14.25 |
| Peak T, ° C. | 33.67 | 31.24 |

TABLE 21

|  | B5 | B6 | B7 | B8 |
|---|---|---|---|---|
| Cement | 41.7 | 41.7 | 41.7 | 41.7 |
| Clay | 0 | 5.0 | 5.0 | 0 |
| Accelerant | 0 | 0 | 0 | 5.0 |
| Sand | 27.9 | 24.2 | 17.5 | 10.1 |
| Filler | 20.0 | 20.0 | 20.0 | 20.0 |
| Fiber | 9.0 | 9.0 | 9.0 | 9.0 |
| Process Aid | 1.4 | 1.4 | 1.4 | 1.4 |
| Water | 56.3 | 56.3 | 56.3 | 56.3 |
| Time to maximum T, hours | 50.0 | 24.0 | 26.0 | 24.0 |
| Peak T, ° C. | 31.0 | 30.0 | 32.0 | 31.0 |

Together, TABLES 19 and 20 show that clay content may be manipulated in a cementitious formulation described herein to improve reactivity and/or reaction time of a formulation described herein. Clay served to increase reactivity of a formulation comprising a calcium source and a reactant and reduced the overall reaction time (as determined by time to maximum temperature) by more than 50%. Among other things, the addition of clay was found to improve and accelerate the hydration reaction in formulations described herein (e.g., B4, B6 and B7).

In still another example, clay that has been thermally treated may be provided in a formulation described herein. Mineral clays, such as natural montmorillonite clay, have a quartz content ranging from about 2 to 20 wt %. Such clays may also be referred to as alumina clays due to their alumina content. When such clays are thermally treated, hydrocarbon contaminated materials (e.g., organics) are removed. In addition the volume and mobility of inorganics such as metals and salts may be removed with high heat treatment. Thermally treated clays, thus, are cleaner and provide both a reactant and an alumina source for improved formulations described herein. Various mineral and silica properties of thermally treated mineral clays are shown in TABLE 21 in which the clay type, M, is montmorillonite.

TABLE 22

|  | C4 | C5 | C6 | C7 | C8 | C9 |
|---|---|---|---|---|---|---|
| Primary mineral | $Ca^{2+}$ | $Ca^{2+}$ | $Na^+$ | $Na^+$ | $Li^{2+}$ | $Al^{3+}$ |
| Clay type | M | M | M | M | M | M (impure) |
| Quartz content, wt % | 11.1 | 2.9 | 2.1 | 3.3 | 1.8 | 19.4 |

Thermally treated clays from TABLE 21 were used to prepare formulations depicted in TABLE 22. For each comparative formulation (D4 to D9), a clay from TABLE 21 was provided as the reactant and mixed with a calcium source (provided as ordinary Portland cement), a filler in the form of coarse limestone and fiber reinforcement in the form of cellulose fibers provided as refined cellulose pulp. A control formulation (D3) was absent clay and represented a control formulation relying on silica sand (passed through a 200 mesh) as both reactant and filler with an alumina source in the form of alumina trihydrate. All clays were first subjected to thermal treatment by exposing up to 900° C. for a one hour period at maximum temperature to remove chemically bound water in the clay. Materials in TABLE 22 are provided as parts using dry ingredients.

TABLE 23

|  | D3 | D4 | D5 | D6 | D7 | D8 | D9 |
|---|---|---|---|---|---|---|---|
| Cement | 28.7 | 28.7 | 28.7 | 28.7 | 28.7 | 28.7 | 28.7 |
| Fiber | 7.0 | 7.0 | 7.0 | 7.0 | 7.0 | 7.0 | 7.0 |
| Filler | 0 | 32.15 | 32.15 | 32.15 | 32.15 | 32.15 | 32.15 |
| Silica sand | 60.8 | 0 | 0 | 0 | 0 | 0 | 0 |
| Alumina | 3.5 | 0 | 0 | 0 | 0 | 0 | 0 |
| C4 clay | 0 | 32.15 | 0 | 0 | 0 | 0 | 0 |
| C5 clay | 0 | 0 | 32.15 | 0 | 0 | 0 | 0 |
| C6 clay | 0 | 0 | 0 | 32.15 | 0 | 0 | 0 |
| C7 clay | 0 | 0 | 0 | 0 | 32.15 | 0 | 0 |
| C8 clay | 0 | 0 | 0 | 0 | 0 | 32.15 | 0 |
| C9 clay | 0 | 0 | 0 | 0 | 0 | 0 | 32.15 |
| Water | 175.0 | 175.0 | 175.0 | 175.0 | 175.0 | 175.0 | 175.0 |

Formulation were processed by mixing dry materials in a mechanical mixer and then straining excess water through a wire mesh under pressure of about 0.3 tons/square inch until the composition was approximately 30 parts water and 70 parts solid. This was followed by a curing in a steam autoclave set at a temperature reaching about 170° C. or greater for about 8 hours. After cooling to room temperature, materials was analyzed for residual quartz content using acid insoluble residue XRD as described with TABLE 18. Additionally, saturated ultimate strength and saturated ultimate strain (both in flexure mode) were evaluated as well as moisture movement before and after carbonation as previously described. Data are provided in TABLE 23.

TABLE 23

|  | C3 | C4 | C5 | C6 | C7 | C8 | C9 |
|---|---|---|---|---|---|---|---|
| Residual quartz content, wt. % | 49.3 |  | 0.89 | 0.59 | 0.33 |  |  |
| Saturated ultimate flexural strength, MPa | 6.3 | 2.7 | 4.8 | 6.3 | 5.7 | 2.7 | 3.3 |
| Pre-carbonation moisture movement, % | 0.16 | 0.16 | 0.17 | 0.17 | 0.2 | 0.13 | 0.16 |
| Post-carbonation moisture movement, % | 0.17 | 0.35 | 0.32 | 0.32 | 0.23 | 0.28 | 0.29 |

From TABLE 23, it is found that formulations relying on a reactant as thermally treated clay may be substituted ordinary cementitious formulations. In addition to significantly reducing residual silica content, formulations described herein provided comparable if not superior flexural strength and/or reductions in moisture movement. Sodium containing clays (C6 and C7) when provided in formulations described herein (D6 and D7, respectively) provided higher ultimate flexural strength as compared with the control formulation (D3) using coarse silica sand.

Accordingly, in one or more embodiments described herein are improved cementitious formulations that may be thermally treated and have appropriate strength characteristics as may be needed for articles formed from such formulations. Formulations as described herein rely on increased reactivity of a pozzolan as a reactant. Reactivity is increased by increasing surface area of the particle and by addition of a preferred alumina source, calcium source, filler and/or additive (e.g., catalyst, defoamer). The reactant may be added or chosen to match the chemistry and desired strength (or other mechanical/physical properties) of the desired end product. The reactant described herein is thermally stable and able to undergo a reaction under hydrothermal condition to form a cementitious product with suitable matrix strength and phase properties.

While typical poor pozzolans, such as crystalline silica, do not easily react with a cement source to provide a cementitious matrix with high strength properties, a reactant described herein in the form of crystalline silica is a good reactant when engineered for reactivity and for providing strength characteristics to a formed product. Moreover, as described, products formed may be engineered with a desired tobermorite and/or hydrogarnet/katoite content depending on the degree of reactivity (e.g., source and/or content of reactant, alumina source, calcium source, and/or additive). Consequently, as described herein, formulations may be designed to prepare cementitious materials, articles and products with different strengths (and other physical and/or mechanical properties).

Formulations and compositions thereof as described herein are suitable for products requiring silica, such as stone, clay and cement products, glass, enamels, ceramic products and glazes. Compositions herein may also be useful as an abrasive, as grinding media, in cleansers, construction materials, as fillers and extenders in coatings, as a wood or cement filler; and in the production of chemicals.

Formulations and the compositions produced exhibit comparable or superior properties as compared with formulations and compositions having much higher levels of a less reactive pozzolan (e.g., crystalline silica). Formulations are designed to provide the appropriate strength to a cured product by selecting a highly reactive pozzolan that forms the desired strength, contributing phases to the matrix and by reducing blooming during a curing (which occurs with typical lime-containing formulations not described herein). Because lime blooming may cause coating and adhesive problems to a cured formulation and, in many instances, discoloration of surfaces when painted, reductions in blooming is important for improved formulations as described herein.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims.

What is claimed is:

1. A cured cementitious formulation formed by reacting a reactant with a calcium source, said formulation comprising:
    silicon dioxide, wherein the silicon dioxide comprises reacted silica and unreacted residual $SiO_2$;
    calcium oxide; and
    a filler, wherein the reacted calcium oxide to total reacted silicon dioxide molar ratio is between about 0.80 and 1.80, wherein the reacted calcium oxide to the unreacted residual crystalline $SiO_2$ molar ratio is between about 1.0 and 8.0, and wherein the total reacted silicon dioxide is the sum of the reacted silica from any source in the formulation, wherein the unreacted residual $SiO_2$ content based on total weight is between about 5% and 30%.

2. The formulation of claim 1, wherein the reactant is a pozzolan provided at a wt. % less than 25% and is greater than 500 $m^2$/kg Blaine.

3. The formulation of claim 1, wherein the reactant is crystalline silica.

4. The formulation of claim 1, wherein the unreacted residual $SiO_2$ content is less than about 15% by weight.

5. The formulation of claim 1, wherein the formulation under hydrothermal conditions forms advanced calcium silicate hydrate phases selected from the group consisting of tobermorite, katoite, hydro garnet and combinations thereof.

6. The formulation of claim 1, wherein the filler is in an amount of between about 20 wt. % to 80 wt. % of the dry formulation, has a particle size of less than 50 microns and a density of between about 90 to 130 $kg/m^3$.

7. The formulation of claim 1, wherein the filler is generally non-reactive and does not undergo substantial dissolution.

8. The formulation of claim 1, wherein the filler is a calcium source.

9. The formulation of claim 1, wherein the formulation has an calcium oxide to unreacted residual $SiO_2$ molar ratio of about 1.0.

10. The formulation of claim 1, wherein the formulation further comprises one or more additives in an amount between about 5 and 50 wt. % based on total dry ingredients.

11. The formulation of claim 10, wherein the one or more additives are in the form of one or more catalysts, defoaming agents, clay, alumina source, low density modifiers and fibrous materials.

12. The formulation of claim 1, wherein the formulation is hydrothermally cured.

* * * * *